United States Patent
Greene

(10) Patent No.: US 11,087,181 B2
(45) Date of Patent: Aug. 10, 2021

(54) BAYESIAN METHODOLOGY FOR GEOSPATIAL OBJECT/CHARACTERISTIC DETECTION

(71) Applicant: Google LLC, Mountain View, CA (US)

(72) Inventor: Michael Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 16/468,196

(22) PCT Filed: May 24, 2017

(86) PCT No.: PCT/US2017/034208
§ 371 (c)(1),
(2) Date: Jun. 10, 2019

(87) PCT Pub. No.: WO2018/217193
PCT Pub. Date: Nov. 29, 2018

(65) Prior Publication Data
US 2020/0012903 A1  Jan. 9, 2020

(51) Int. Cl.
*G06T 7/73* (2017.01)
*G06K 9/62* (2006.01)
(Continued)

(52) U.S. Cl.
CPC ......... *G06K 9/6278* (2013.01); *G06F 16/387* (2019.01); *G06K 9/46* (2013.01);
(Continued)

(58) Field of Classification Search
CPC combination set(s) only.
See application file for complete search history.

(56) References Cited

U.S. PATENT DOCUMENTS 5,959,574 A    9/1999  Poore, Jr.
9,098,741 B1 * 8/2015  Anguelov ............ G06K 9/3241
(Continued)

FOREIGN PATENT DOCUMENTS

CN    101702165 A    5/2010
CN    103235949 A    8/2013
(Continued)

OTHER PUBLICATIONS

International Preliminary Report on Patentability for International Application No. PCT/US2017/034208 dated Aug. 8, 2019. 11 pages.
(Continued)

*Primary Examiner* — Cindy Trandai
(74) *Attorney, Agent, or Firm* — Lerner, David, Littenberg, Krumholz & Mentlik, LLP

(57) ABSTRACT

A location of an object of interest (205) is determined using both observations and non-observations. Numerous images (341-345) are stored in a database in association with image capture information, including an image capture location (221-225). Image recognition is used to determine which of the images include the object of interest (205) and which of the images do not include the object of interest. For each of multiple candidate locations (455) within an area of the captured images, a likelihood value of the object of interest existing at the candidate location is calculated using the image capture information for images determined to include the object of interest and using the image capture information for images determined not to include the object of interest. The location of the object is determined using the likelihood values for the multiple candidate locations.

20 Claims, 11 Drawing Sheets

(51) Int. Cl.
  *G06T 7/11* (2017.01)
  *G06T 7/70* (2017.01)
  *G06F 16/387* (2019.01)
  *G06K 9/46* (2006.01)

(52) U.S. Cl.
  CPC .............. *G06K 9/6296* (2013.01); *G06T 7/11* (2017.01); *G06T 7/70* (2017.01); *G06T 2207/20104* (2013.01)

(56) References Cited

U.S. PATENT DOCUMENTS

| | | | |
|---|---|---|---|
| 10,032,078 B2* | 7/2018 | Schultz | G06K 9/0063 |
| 10,147,399 B1* | 12/2018 | Mott | G09G 5/377 |
| 2005/0074164 A1 | 4/2005 | Yonaha | |
| 2005/0223031 A1 | 10/2005 | Zisserman et al. | |
| 2006/0088207 A1 | 4/2006 | Schneiderman | |
| 2009/0055204 A1 | 2/2009 | Pennington et al. | |
| 2009/0297045 A1* | 12/2009 | Poetker | G06Q 30/0201 382/224 |
| 2012/0121161 A1 | 5/2012 | Eade et al. | |
| 2015/0029182 A1* | 1/2015 | Sun | G06T 17/00 345/419 |
| 2015/0161441 A1 | 6/2015 | Robinson et al. | |
| 2015/0235364 A1* | 8/2015 | Aguirre-Valencia | G06T 7/33 382/131 |
| 2016/0320951 A1* | 11/2016 | Ernst | G06K 9/4604 |
| 2017/0287170 A1* | 10/2017 | Perona | G06K 9/00664 |
| 2017/0289522 A1* | 10/2017 | Zhang | H04N 13/232 |
| 2017/0316285 A1* | 11/2017 | Ahmed | G06K 9/6223 |
| 2018/0205906 A1* | 7/2018 | Boyle | H04N 5/77 |
| 2019/0213437 A1* | 7/2019 | Baumela Molina | G06K 9/00664 |

FOREIGN PATENT DOCUMENTS

| | | |
|---|---|---|
| CN | 103366156 A | 10/2013 |
| CN | 103971589 A | 8/2014 |

OTHER PUBLICATIONS

V. Lavrenko et al., A Model for Learning the Semantics of Pictures, Center for Intelligent Information Retrieval Computer Science Department, University of Massachusetts Amherst, 2003, 8 pages.

Hedi Harzallah, Frederic Jude, Cordelia Schmid. Combining efficient object localization and image classification. ICCV 2009—12th International Conference on Computer Vision, Sep 2009, Kyoto, Japan. IEEE, pp. 237-244, 2009, <10.1109/ICCV.2009.5459257>. < inria-00439516>.

Bo Wu and Ram Nevatia, Detection of Multiple, Partially Occluded Humans in a Single Image by Bayesian Combination of Edgelet Part Detectors, University of Southern California, 2005, 8 pages.

Josef Sivic et al., Discovering Objects and Their Location in Images, Carnegie Mellon University Robotics Institute School of Computer Science, 2005, 9 pages.

Zoran Zivkovic, Improved Adaptive Gaussian Mixture Model for Background Subtraction, Intelligent and Autonomous Systems Group University of Amsterdam, The Netherlands, In Proc. ICPR, 2004, 4 pages.

Sebastian Thrun and Arno Bücken, Learning Maps for Indoor Mobile Robot Navigation, School of Computer Science, Carnegie Mellon University, CMU-CS-96-121, Apr. 1996, 38 pages.

Agarwal et al., Learning to Detect Objects in Images via a Sparse, Part-Based Representation, IEEE Transaction on Pattern Analysis and Machine Intelligence, Vo. 26, No. 11, Nov. 2004, pp. 1475-1490.

Agarwal et al., Learning to Detect Objects in Images via a Sparse, Part-Based Reresentation, Slide presentation presented by: Piotr Dollar, Nov. 30, 2004, 19 pages.

Fergus et al., Object Class Recognition by Unsupervised Scale-Invariant Learning, 2003, 8 pages.

Megha Pandey and Svetlana Lazebnik, Scene Recognition and Weakly Supervised Object Localization with Deformable Part-Based Models, Dept. of Computer Science, University of North Caronlina at Chapel Hill, 2011, 8 pages.

Marcin Marszalek, Cordelia Schmid. Semantic Hierarchies for Visual Object Recognition. CVPR 2007 IEEE Conference on Computer Vision & Pattern Recognition, Jun. 2007, Minneapolis, United States. IEEE Computer Society, pp. I-7, 2007, <http: 1 l ieeexplore. ieee.orglxpls l abs_all.jsp? arnumber=4270297>. < 10.1109 ICVPR. 2007.383272>. < inria-00548680>.

Michael Montemerlo and Sebastian Thrun, Simultaneous Localization and Mapping with Unknown Data Association Using FastSLAM, Robotics Institute at Carnegie Mellon University, 2003, 7 pages.

Charles Bibby and Ian Reid, Simultaneous Localisation and Mapping in Dynamin Environments (SLAMIDE) with Reversible Data Association ,Proc. Robotics: Science and Systems Conference, Atlanta, Jun. 2007, 8 pages.

Argonaut Varun. "Using Google Street View and Camfind to programmatically detect fire hydrants." Feb. 6, 2015 (Feb. 6, 2015), XP055446406. 8 pages. Retrieved from the Internet: URL: <http://www.argolabs.org/blog-1/2015/1/27/using-google-street-view-and-camfind-to-programmatically-detect-fire-hydrants>.

Wegner, Jan D et al. "Cataloging Public Objects Using Aerial and Street-Level Images—Urban Trees." 2016 IEEE Conference on Computer Vision and Pattern Recognition (CVPR), IEEE, Jun. 27, 2016 (Jun. 27, 2016), pp. 6014-6023, XP033021800, DOI: 10.1109/CVPR.2016.647.

Shervin Ardeshir et al. "GIS-Assisted Object Detection and Geospatial Localization." In: "ICEC 2006." Jan. 1, 2014 (Jan. 1, 2014), Springer International Publishing, Cham 032548, XP055446922, ISSN: 0302-9743 ISBN: 378-3-642-01969-2, vol. 8694, pp. 602-617, DOI: 10.1007/978-3-319-10599-4_39.

Yitao, Hu et al: "ALPS: Accurate Landmark Positioning at City Scales", Pervasive and Ubiquitous Computing, ACM, 2 Penn Plaza, Suite 701, New York, NY 10121-0701, USA, Sep. 12, 2016 (Sep. 12, 2016), pp. 1147-1158, XP058279141, DOI: 10.1145/2971648. 2971674, ISBN: 978-1-4503-4461-6.

International Search Report and Written Opinion dated Feb. 13, 2018, for International Application No. PCT/US2017/034208. 13 pages.

Written Opinion for International Application No. PCT/US2017/034208 dated Apr. 30, 2019. 6 pages.

Notification on Grant of Patent Right and Notification for Patent Registration Formalities for Chinese Patent Application No. 201810150231.9 dated Jun. 2, 2021. 5 pages.

\* cited by examiner

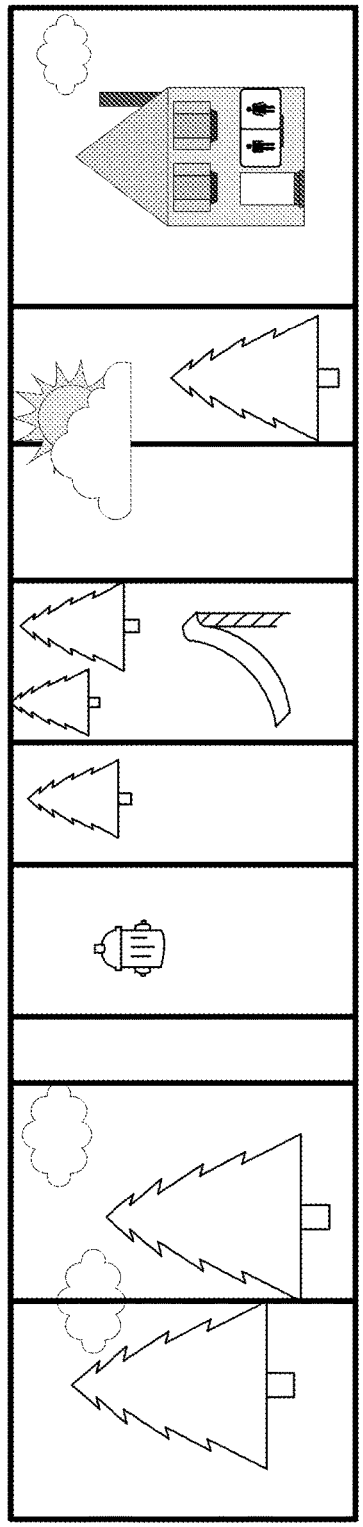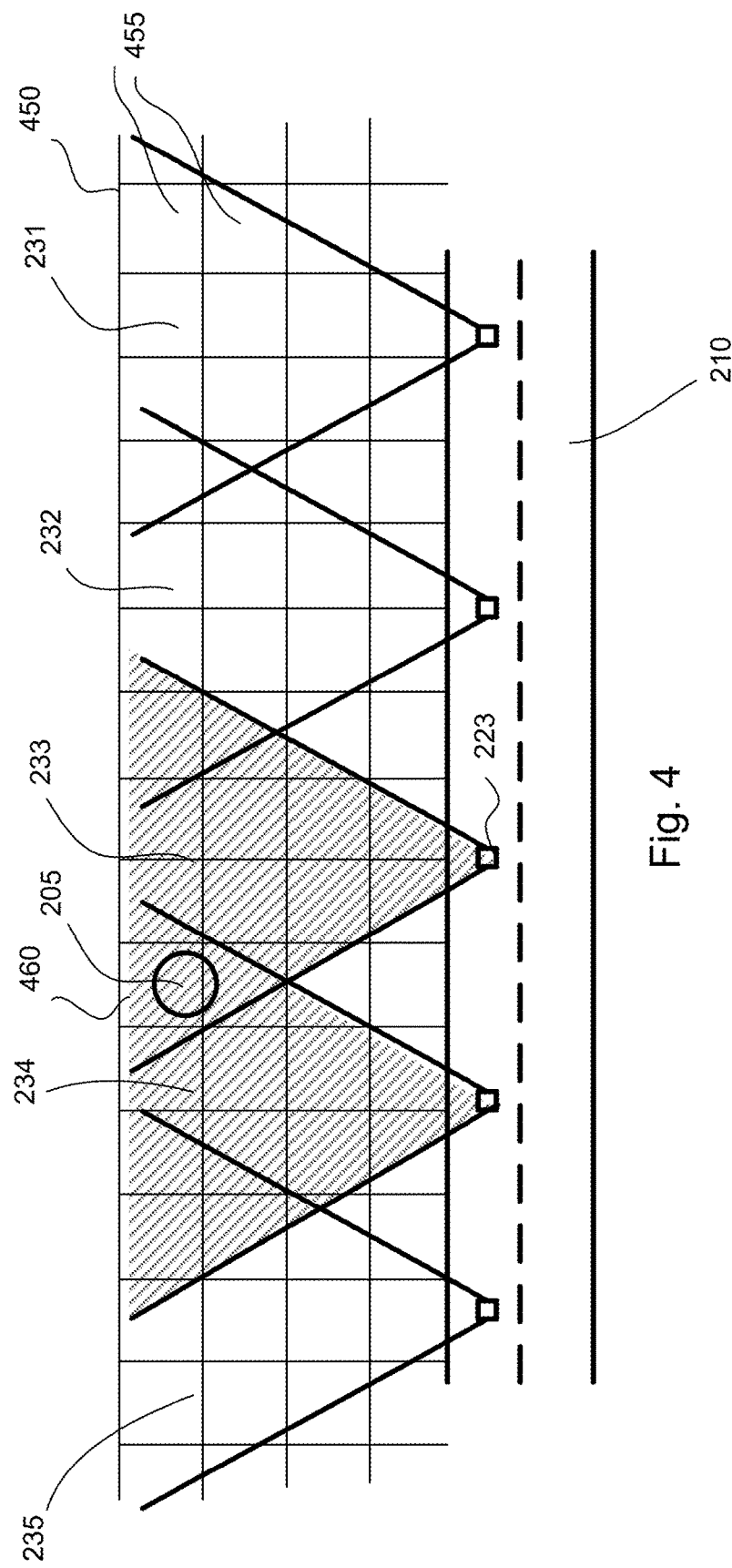
Fig. 4

BAYESIAN METHODOLOGY FOR GEOSPATIAL OBJECT/CHARACTERISTIC DETECTION

CROSS-REFERENCE TO RELATED APPLICATION

This application is a national phase entry under 35 U.S.C. § 371 of International Application No. PCT/US2017/034208, filed May 24, 2017, the entire disclosure of which is incorporated herein by reference.

BACKGROUND

Over time, greater and greater volumes of geospatial imagery have become available. Performing semantic searching through such imagery has become more challenging with the increased volume. Semantic searching is looking for a specific object or environmental attribute, such as a lamp post or park land, by name rather than for an exact pattern of pixels. Traditional methods of semantic searching require manual review, and emerging methods require elaborately trained and tuned purpose-specific image recognition models. For example, manual triangulation is very labor intensive, slow, and costly, while automated triangulation requires sophisticated and laboriously-created localization-specific image recognition models or very high-resolution imagery, and may still provide an imprecise location. While general-purpose image classification models are becoming available for photo storage or web searching, these unspecialized models lack the precision to adequately localize objects.

BRIEF SUMMARY

One aspect of the disclosure provides a method of determining a location of an object of interest. This method includes identifying, from a database of images, a set of plural images that relate to a region of interest, each of the plural images having associated therewith image capture information including at least an image capture location. The method further includes applying an image recognition tool to each image in the set of plural images, and determining, based on the applying of the image recognition tool, which of the images include the object of interest and which of the images do not include the object of interest. For each of multiple candidate locations in the region of interest, a likelihood value of the object of interest existing at the candidate location is calculated using the image capture information for images in the set of plural images determined to include the object of interest and using the image capture information for images in the set of plural images determined not to include the object of interest. The location of the object is determined using the likelihood values for the multiple candidate locations.

According to some examples, the image capture information for at least some of the images includes an image capture location and an image capture orientation, and calculating the likelihood value of the object of interest existing at a given location comprises using the image capture orientation.

In either of the foregoing embodiments, determining which of the images include an object of interest and which of the images do not include the object of interest may include determining a confidence factor that the images include or do not include the object of interest, and calculating the likelihood value of the object of interest existing at the location may include using the using the determined confidence factor.

In any of the foregoing embodiments, calculating the likelihood value of the object of interest existing at the candidate location may include applying a factor with a first sign for the images in the set of plural images determined to include the object of interest, and applying a factor with a second sign for the images in the set of plural images determined not to include the object of interest, the second sign being opposite the first sign.

In any of the foregoing embodiments, the multiple candidate locations in the region of interest may include a grid of multiple locations.

In any of the foregoing embodiments, the multiple candidate locations may include locations contained in a field of view of each image of the set of plural images.

In any of the foregoing embodiments, the image recognition tool may be configured to detect discrete objects.

In any of the foregoing embodiments, the image recognition tool may be configured to detect objects having specific characteristics.

In any of the foregoing embodiments, the image recognition tool may be selected from a library of image recognition tools.

Another aspect of the disclosure provides a system, including memory storing a plurality of images in association with location information, and one or more processor in communication with the memory. The one or more processors are programmed to identify, from the plurality of images, a set of images that relate to a region of interest, determine, using image recognition, which of the images include the object of interest, and determine, using image recognition, which of the images do not include the object of interest. For each of multiple candidate locations in the region of interest, a likelihood value of the object of interest existing at the candidate location is calculated using the location information for images in the set of images determined to include the object of interest and using the location information for images in the set of images determined not to include the object of interest. The one or more processors are further programmed to determine the location of the object using the likelihood values for the multiple candidate locations. In some examples, the system may further include an image recognition tool used to identify objects or attributes in the images. Further, the one or more processors may also be configured to provide the determined location information for output to a display.

Another aspect of the disclosure provides a computer-readable medium storing instructions executable by a processor for performing a method of determining a location of an object of interest. Such instructions provide for identifying, from a database of images, a set of plural images that relate to a region of interest, each of the images having associated therewith image capture information including at least an image capture location, applying an image recognition tool to each image in the set of images, determining, based on the applying of the image recognition tool, which of the images include the object of interest and which of the images do not include the object of interest. For each of multiple candidate locations in the region of interest, the instructions further provide for calculating a likelihood value of the object of interest existing at the candidate location using the image capture information for images in the set of plural images determined to include the object of interest and using the image capture information for images in the set of images determined not to include the object of interest, and determining the location of the object using the likelihood values for the multiple candidate locations.

BRIEF DESCRIPTION OF THE DRAWINGS

FIG. 4 is a top-view illustration of observations and non-observations in relation to a plurality of cells according to aspects of the disclosure.

DETAILED DESCRIPTION

Overview

Figure 1:
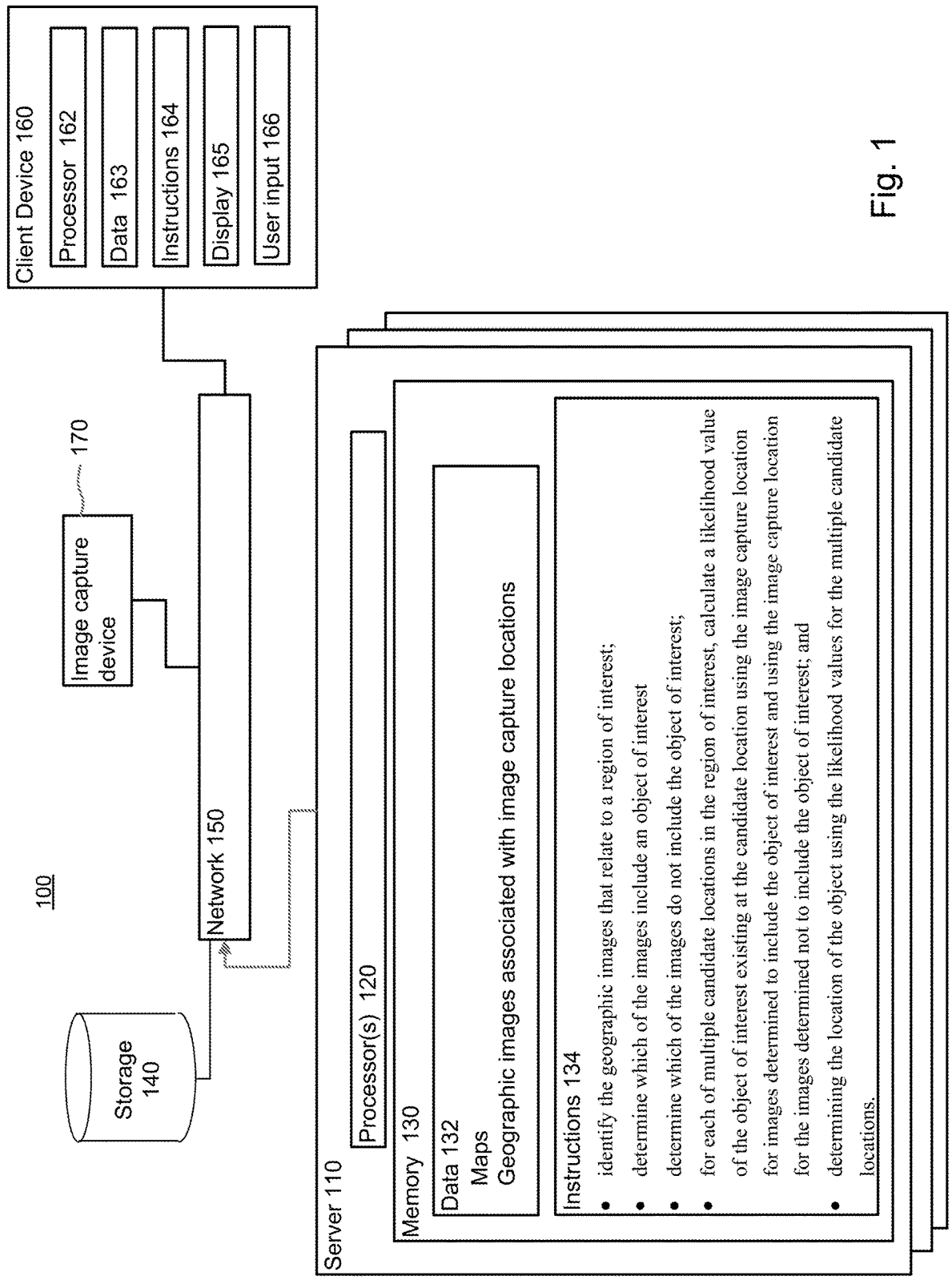
FIG. 1 is a block diagram of an example system according to aspects of the disclosure.

The technology relates generally to image recognition and mapping. More particularly, information derived from both observations and non-observations is used to localize a particular object or feature. For example, to locate all fire hydrants within a target geographic region, image recognition may be performed on images of the region, where images including hydrants as well as images not including hydrants are used to more accurately compute the locations of each hydrant. The non-observations near an observation significantly narrow the range of places an object could be. By using an image recognition tool and calculating likelihoods for multiple locations, the location of the object can be determined relatively easily and with relatively high confidence even if the images are not high resolution and/or are associated with low resolution or unreliable image capture information. This can allow object location identification to be performed using non-professional content, e.g. from smartphones, for instance. By using information for images not determined to include the object of interest, object location identification can be improved. Moreover, this can be achieved at no or relatively little computational cost.

An initialized value is determined for a set of candidate locations for the particular object or feature. For example, the initialized value for each candidate location may be set to zero or, in a more-sophisticated version, set to a prior likelihood value, prior to image recognition analysis, representing a likelihood that the object or feature is present in that location. For example, for each location, prior to applying an image recognition tool, a likelihood that the location contains a fire hydrant may be x %, based on a number of fire hydrants in the target area and a size of the target area. The candidate locations may each be defined by, for example, a discrete list of sites (e.g., only street corners), a grid or gridoid division of the target region into cells, a rasterized map of the target region (e.g., each pixel of the raster is a cell), or a continuous vector-and-gradient defined set of regions.

For each image in a plurality of images, an image recognition tool is applied to the image to obtain a score or confidence rating that the particular object or feature is visible in the image. This score or confidence rating may be converted into a normalized value indicating an amount that a likelihood of the object being located in a region depicted in the image increased after the image recognition. For example, where the prior likelihood (prior to image recognition analysis) that the image contains a fire hydrant is x %, after image recognition that likelihood may increase from x % to (x+n) % or decrease from (x %) to (x−m) % depending on whether or not a hydrant was recognized in the image. And after processing successive images, the prior likelihood may increase or decrease successively (additively or otherwise) into a posterior probability and/or a normalized likelihood score. In some examples, a log Bayes factor may be used. This can provide a particularly computationally efficient manner of using both observations of the object and non-observations of the object to identify the location of the object.

Candidate locations contained within a field of view of each image are identified, for example, using camera characteristics and pose. In some examples, camera geometry plus some default horizon distance may define a sector, which is compared to the initialized set of candidate locations, to determine which candidate locations are contained within the sector. In other examples, a falloff function may be used representing a probability that an object would be visible in the image conditional on it actually being there, for example, factoring in possible occlusion of the object in the image. The falloff function may be non-radial and/or location-dependent, for example, accounting for other factors like local population density or vegetation density which would increase the risk of occlusion. Using information relating to the orientation of an image capture device can allow improved object location detection. However, object location detection can be performed even if some or all of the images do not include image capture orientation information.

A likelihood score may be computed for each candidate location determined to be visible in the image based on the normalized value and the initialized value for each of these location candidates. For example, the normalized value may be added to or multiplied with the initialized value, discounted if a falloff function is used. In some examples, the likelihood score may be compared to a threshold, above which the object may be determined to be at the candidate location corresponding to that likelihood score. In other examples, the likelihood score may be converted to a probability of the object or attribute being present at that candidate location. This can allow information to be used in object location identification even if there is not absolute confidence in object identification from the image recognition tool.

Example Systems

FIG. 1 illustrates an example system for semantic searching of images. It should not be considered as limiting the scope of the disclosure or usefulness of the features described herein. In this example, system 100 can include computing devices 110 in communication with one or more client devices 160, 170, as well as storage system 140, through network 150. Each computing device 110 can contain one or more processors 120, memory 130 and other components typically present in general purpose computing devices. Memory 130 of each of computing device 110 can store information accessible by the one or more processors 120, including instructions 134 that can be executed by the one or more processors 120.

Memory 130 can also include data 132 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 134 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 132 may be retrieved, stored or modified by the one or more processors 220 in accordance with the instructions 134. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 120 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as image recognition, object recognition, image encoding, tagging, etc.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 134 and collectively form a medium for storing the instructions. Various operations described herein as being performed by a computing device may be performed by a virtual machine. By way of example, instructions 134 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Each of the computing devices 110, 160, 170 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 140 as well as computing devices 160, 170 via the network 150. For example, one or more of server computing devices 110 may use network 150 to transmit and present information to a user on a display, such as display 165 of computing device 160. In this regard, computing devices 160, 170 may be considered client computing devices and may perform all or some of the features described herein.

Each of the client computing devices 160, 170 may be configured similarly to the server computing devices 110, with one or more processors, memory and instructions as described above. Each client computing device 160, 170 may be a personal computing device intended for use by a user, and have all of the components normally used in connection with a personal computing device such as a central processing unit (CPU), memory (e.g., RAM and internal hard drives) storing data and instructions, a display such as display 165 (e.g., a monitor having a screen, a touch-screen, a projector, a television, or other device that is operable to display information), and user input device 166 (e.g., a mouse, keyboard, touch-screen, or microphone). The client computing device may also include a camera 167 for recording video streams and/or capturing images, speakers, a network interface device, and all of the components used for connecting these elements to one another. The client computing device 160 may also include a location determination system, such as a GPS 168. Other examples of location determination systems may determine location based on wireless access signal strength, images of geographic objects such as landmarks, semantic indicators such as light or noise level, etc.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

In other examples, one or more of the client devices 160, 170 may be used primarily for input to the server 110 or storage 140. For example, the client device 170 may be an image capture device which captures geographical images. For example, the image capture device 170 may be a still camera or video camera mounted to a vehicle for collecting street-level imagery. As another example, the image capture device 170 may use sonar, LIDAR, radar, laser or other image capture techniques. In other examples the device 160 may be an audio capture device, such as a microphone or other device for obtaining audio. In further examples the image capture device may be a radio frequency transceiver or electromagnetic field detector. Further, the image capture device 170 may be handheld or mounted to a device, such as an unmanned aerial vehicle. Accordingly, the image capture device 170 may capture street-level images, aerial images, or images at any other angle.

As with memory 130, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110.

Storage system 140 may store data, such as geographical images. The geographical images may be stored in association with other data, such as location data. For example, each geographical image may include metadata identify a location here the image was captured, camera angle, time, date, environmental conditions, etc. As another example, the geographical images may be categorized or grouped, for example, based on region, date, or any other information.

Figure 2:
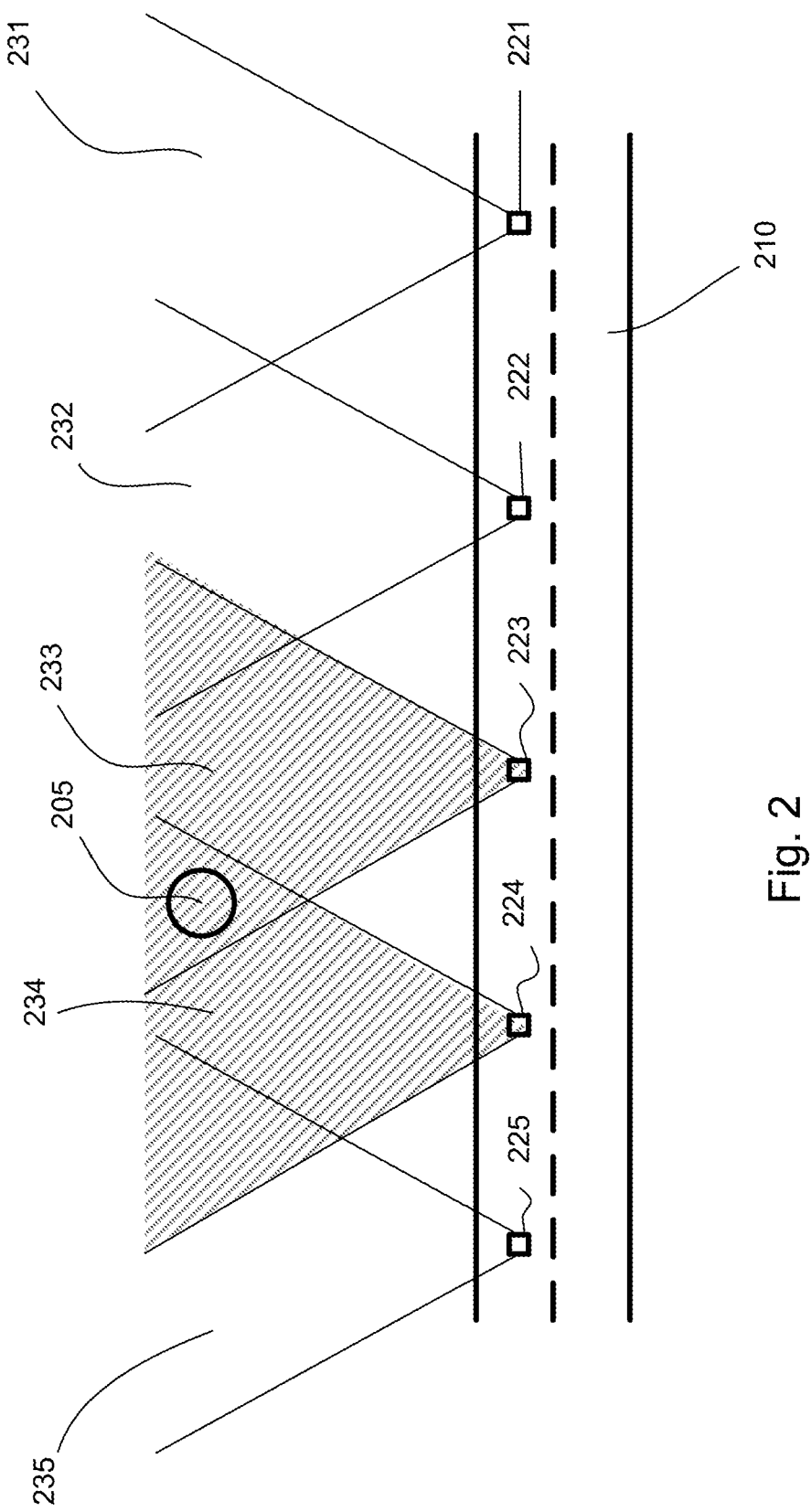
FIG. 2 is a top-view illustration of example observations and non-observations according to aspects of the disclosure.

FIG. 2 is a top-view illustration of example observations and non-observations of a particular object 205. In this example, an image capture device moving along a roadway 210 captures images at each of a plurality of capture locations 221-225 along the roadway 210. Each image has an associated field of view 23-235. For example, based on a position and angle of the image capture device at capture location 221, it captures imagery of everything within field of view 231. Similarly, at subsequent capture location 223, the image capture device would capture imagery of objects within field of view 233. When searching for the particular object 205, fields of view 233 and 234, which include the object 205, are considered observations of that object. Fields of view 231, 232, and 235, which do not include the object 205, are considered non-observations.

Both the observations and non-observations are used to precisely determine a location of the object 205. For example, consideration of where the object 205 is not located helps to narrow the possibilities of where the object 205 is located. As explained in further detail below, determining the location of the object 205 using observations and non-observations includes initializing a candidate set of detection locations, such as by setting to zero or setting to a likelihood that the candidate location, wherein the likelihood is determine prior to reviewing imagery. Such determination may be based on available information, such as zoning, population density, non-visual signals, etc. Then each image is reviewed to obtain a score or confidence rating that the object is visible in the image. Using a normalization function, the confidence rating is converted into a value that approximates the amount by which the post-image review odds of the object being located in that image's field of view exceed the prior odds, conditional on the observation of that image. The camera characteristics and pose are used to determine which candidate locations are contained in the field of view in this image. The candidate locations may be, for example, sectors defined by the camera geometry and some default horizon distance. The normalized value is then added or multiplied to the initialized value for each of the candidate locations determined to be visible in the image. As a result, a likelihood score for each candidate location is produced. The likelihood score may be compared to a threshold, above which it is determined that the object is located at the candidate location.

In some example, greater precision may be achieved by using a falloff function, such as a radial falloff function, representing the probability that the object would be visible in each image conditional on it's actually being there. For instance, sometimes the object may be occluded in the image by other objects such as trees, cars, fences, etc. Even further precision may be achieved by using a non-radial or location-dependent falloff function. Such function may account for other factors like local population density or vegetation density which would increase the risk of occlusion. In these examples, the result is not just a simple boolean yes/no for containment but also includes a discount factor reflecting the likelihood of a false negative for reasons other than non-presence, such as occlusion.

In addition to detecting objects, these techniques may also be used for determining precise locations of attributes. For example, a search may be performed for geographic areas that are sunny, such as for real-estate searching purposes. Accordingly, images depicting a natural light level above a threshold may be identified as observations, and images depicting a natural light level below the threshold may be identified as non-observations. Relevant timestamp information may also be considered, such as by limiting the searched images to those taken during a particular time of day (e.g., daytime). Image capture information associated with the non-observations may be used to help precisely locate the sunny areas.

Figure 3:
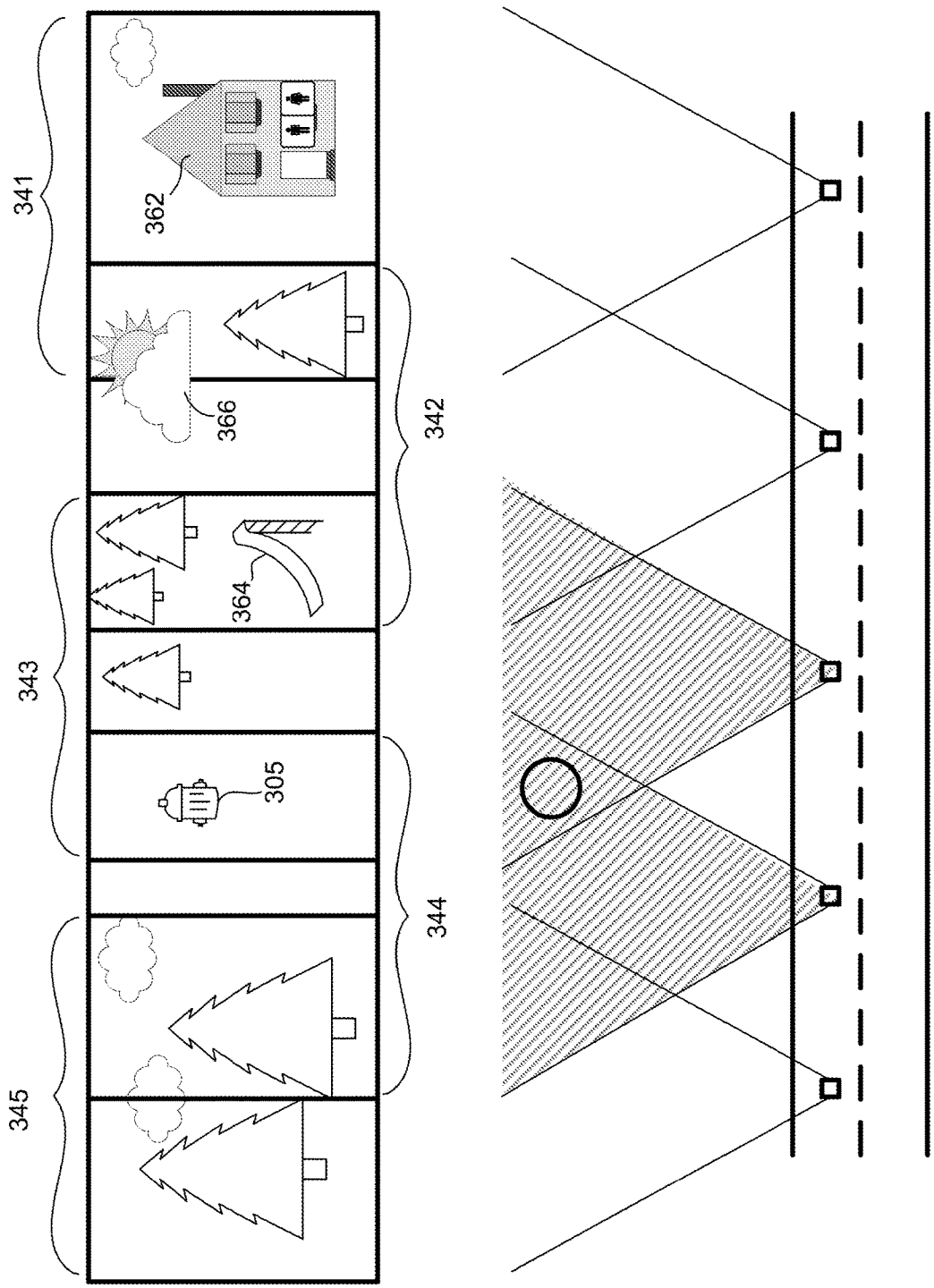
FIG. 3 illustrates street-level imagery in association with the top-view illustration of observations and non-observations of FIG. 2.

FIG. 3 illustrates an example of street-level imagery corresponding to the images captured from capture locations 221-225. The imagery includes a plurality of individual images 341-345 which are overlapped, thus forming an extended or panoramic image. A field of view of each image 341-345 corresponds to the field of view 231-235 from image capture locations 221-225. In this example, the object 205 corresponds to fire hydrant 305. However, any other type of object or attribute may be searched, such as restrooms 362, playground equipment 364, weather conditions 366, or any of a variety of other objects or attributes not shown.

In some examples, regions of interest may be defined by a grid including plurality of cells. For example, FIG. 4 provides a top-view illustration of observations and non-observations in relation to a plurality of cells 455 in a grid 450. Each cell 455 may correspond to a sub-division of a geographic region, with each cell being generally equal in size and shape. In one example, the cells may be defined by latitudinal and longitudinal points.

The grid 450 may be used to define candidate locations for the object 205. For example, prior to reviewing an images, a probability of each cell containing the object 205 may be determined. If the object 205 is a fire hydrant, for example, a number of fire hydrants in the geographical region may be known, and that number may be divided by the number of cells 455. It may then be determined, for each image taken along the roadway 210, whether the image points in a direction that includes a cell. For example, each image may be stored in association with the image capture location and also a direction, such as in a direction the image capture device was pointed. The direction may be defined by conventional coordinates, such as North, West, etc., in relation to other objects, such as between First Street and Second Street, or by any other mechanism. Locations of the cells 355 may be known, and thus a comparison may be performed to determine whether the image includes cells. Each cell may be treated as a discrete data point, positive or negative. In the example of FIG. 4, each of the cells 455 may be considered a candidate location for the object 205. An initial probability of each cell including the object 205, prior to reviewing the images, may be approximately the same for each of the cells 455.

The images 341-345 may then be reviewed, for example, using an image recognition tool to detect objects in the images. Based on the review, a score or confidence rating may be computed for each candidate location, the score or confidence rating indicating a likelihood that the object is located within the candidate location. For each image, a normalization function may be used to convert this confidence rating into a value. In some examples, the normalization may include adjusting the prior computed probabilities for each cell 455. For example, for each observation, the cells included in the fields of view 233, 234 of those observations may be increased in probability that the object 205 is in that cell. Cells within fields of view 231, 232, 235 of non-observations may be attributed a decreased probability.

Some cells in a particular field of view may be attributed a higher score or confidence rating than others, for example, based on location of the cell as compared to a general position of the object 205 within the reviewed image. For example, the hydrant 305 is shown as positioned in a left portion of the image 343. Accordingly, cells in a left portion of field of view 233 may attributed a higher confidence than cells in a right portion of field of view 233. In other examples, other camera characteristics and pose information may be used compute confidence ratings to candidate locations. For example, depth, focus, or any other information may be used.

In some examples, the confidence rating may be increased or further refined as successive images are reviewed. For example, if the image 343 corresponding to capture location 223 is reviewed first, each cell in field of view 233 may be attributed an increased probability of including the object 205. If the image 344 corresponding to capture location 224 is subsequently reviewed, each cell in field of view 234 may be attributed an increased probability of including the object 205. Because the cells including the object 205 are included within both fields of view 233, 234, those cells may result with a higher probability than others.

The normalized value indicating an amount that a likelihood of the object being located in a region depicted in the image increased after the image recognition is then added or multiplied with the initialized value for each candidate location. The result for each candidate location may be compared to other results for other candidate locations. If the resulting value for a first candidate location is comparatively higher than the result for other locations, such as by a predetermined numerical factor, then the first candidate location may be determined to be the location of the object. In other examples, the result is compared to a threshold value. In this regard, a candidate location having a resulting value above the threshold value may be determined to be a location for the object.

Figure 5:
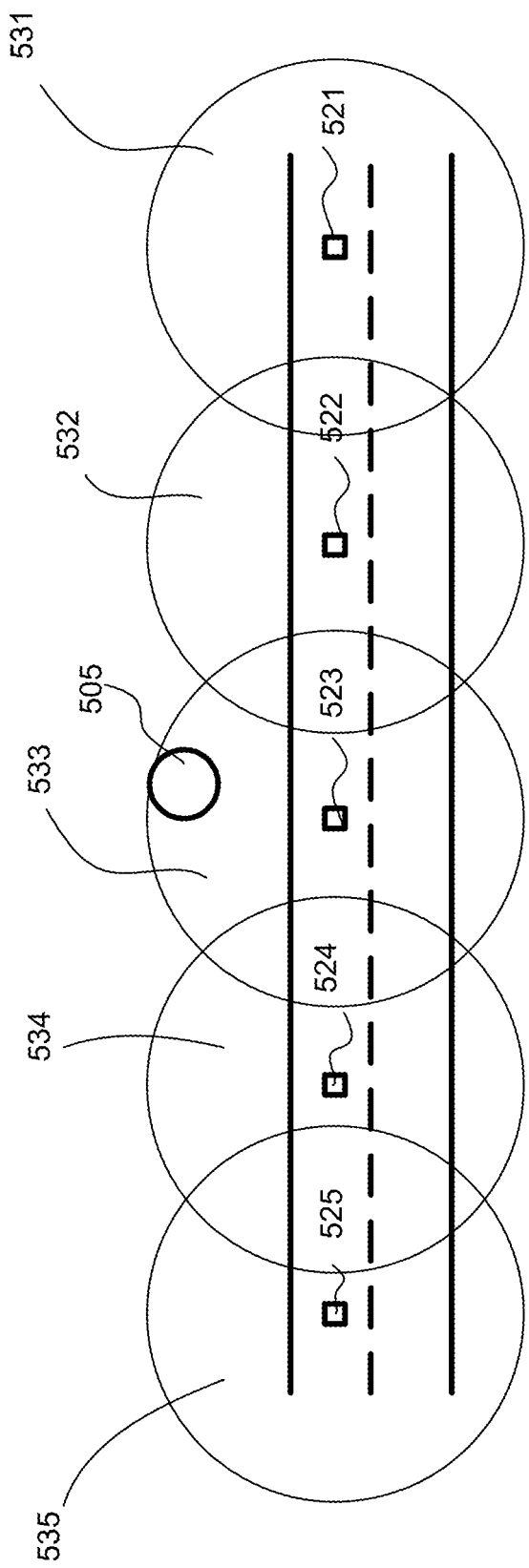
FIG. 5 is a top-view illustration of another example of observations and non-observations according to aspects of the disclosure.

While in the examples above each image is stored with a location and direction, in some examples objects may be located without use of direction information. FIG. 5 is a top-view illustration of such an example. Images captured at various locations 521-525 may have corresponding fields of view 531-535. In this example, each field of view 531-535 may be considered as having a radius around its respective capture location 521-525. The candidate locations within such radial fields of view may include the entire radius or some portion thereof, such as cells or any other subdivision. Initialization and computation of confidence values based on image analysis may be performed as described above.

Figure 6:
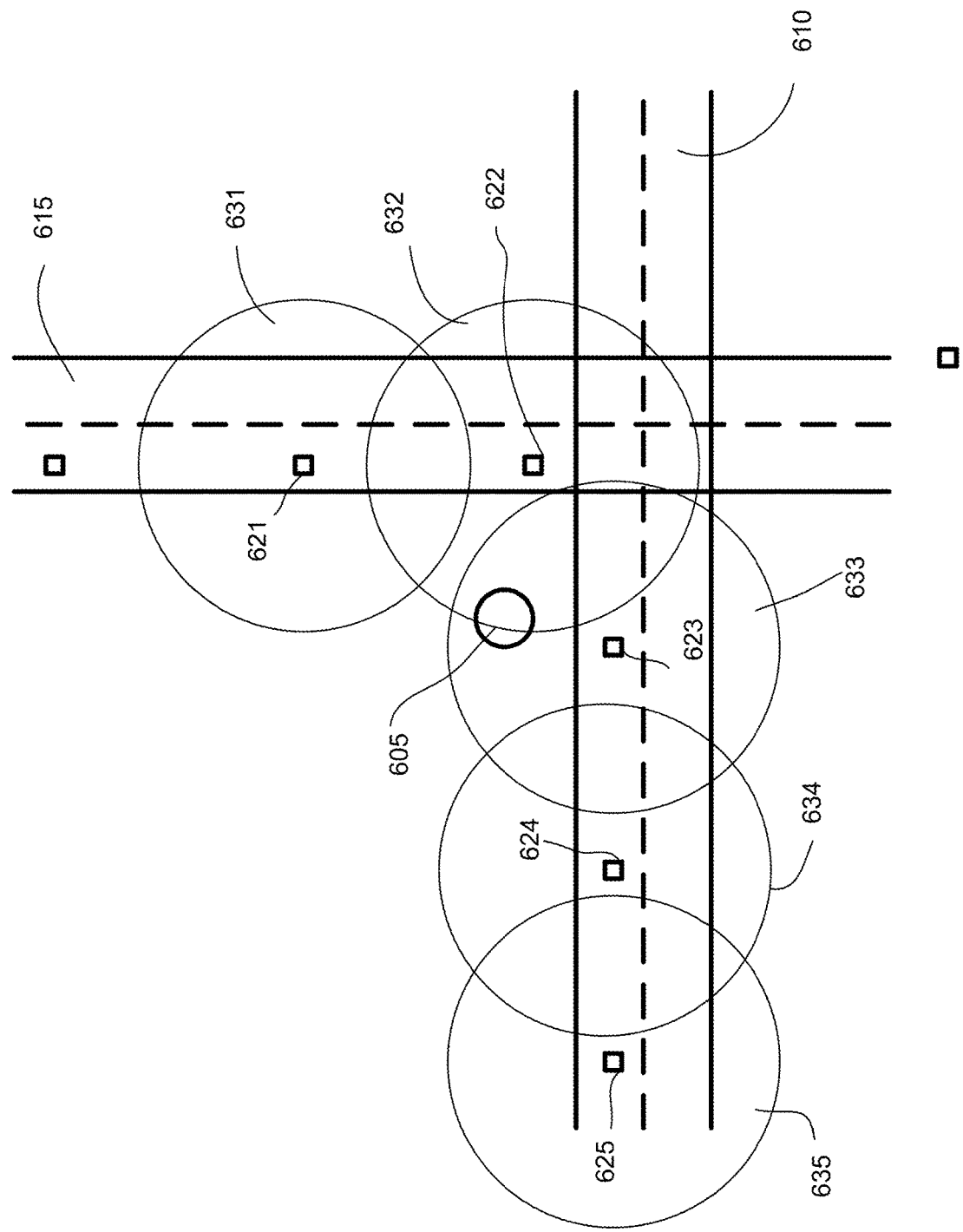
FIG. 6 is a top-view illustration of another example of observations and non-observations according to aspects of the disclosure.

FIG. 6 illustrates another example where directional information for the imagery is not used, though images captured from various angles are used. In this example, a first roadway 610 intersects with a second roadway 615. Images are captured from locations 621, 622 on the second roadway 615, and from locations 623-625 on the second roadway. Accordingly, while the fields of view 631-635 are radial, the positions of the capture locations 621-625 along different axes may further increase the accuracy of localization of object 605. For example, as shown, the object 605 is within the fields of view 632 and 633, but not fields of view 631, 634, 635. The confidence score computed for candidate locations within both fields of view 632, 633 should be greater than those computed for other locations. Accordingly, the normalized value for such candidate locations within both fields of view 632, 633, which factors in non-observations from adjacent fields of view 631, 634, 635 should indicate a high likelihood of the object's presence.

While in many of the examples above the images are described as being captured from locations along a roadway, it should be understood that the images used to locate objects or attributes may be captured from any of a number of off-road locations. For example, images may include user-uploaded photos taken in parks, inside buildings, or anywhere else.

Figure 7:
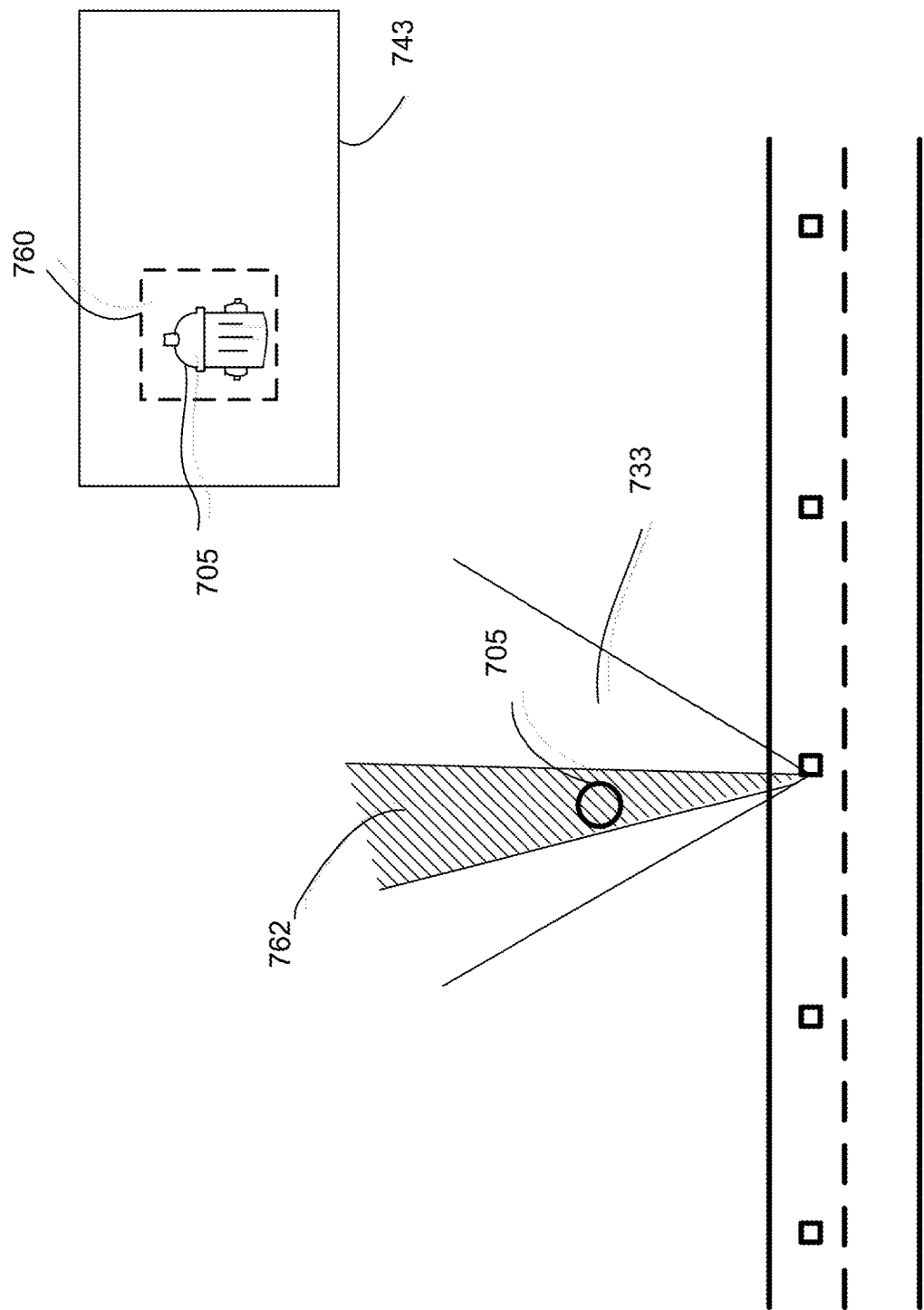
FIG. 7 is a top-view illustration of an example focused observation using a bounding box according to aspects of the disclosure.

FIG. 7 illustrates another example using a bounding box to narrow the candidate locations for object 705. In this example, during review of image 743, which corresponds to field of view 733, a bounding box 760 is drawn around object of interest 705. In this example the object 705 is a fire hydrant. The bounding box 760 corresponds to a narrower slice 762 of the field of view 733. In this regard, candidate locations for which confidence score and normalized values are computed may be limited to locations within the narrower slice 762. Accordingly, locations outside of the slice 762 but still within the field of view 733 may be considered non-observations and used to more precisely locate the object 705. Moreover, computation may be expedited since a reduced number of candidate locations may be analyzed.

Figure 8:
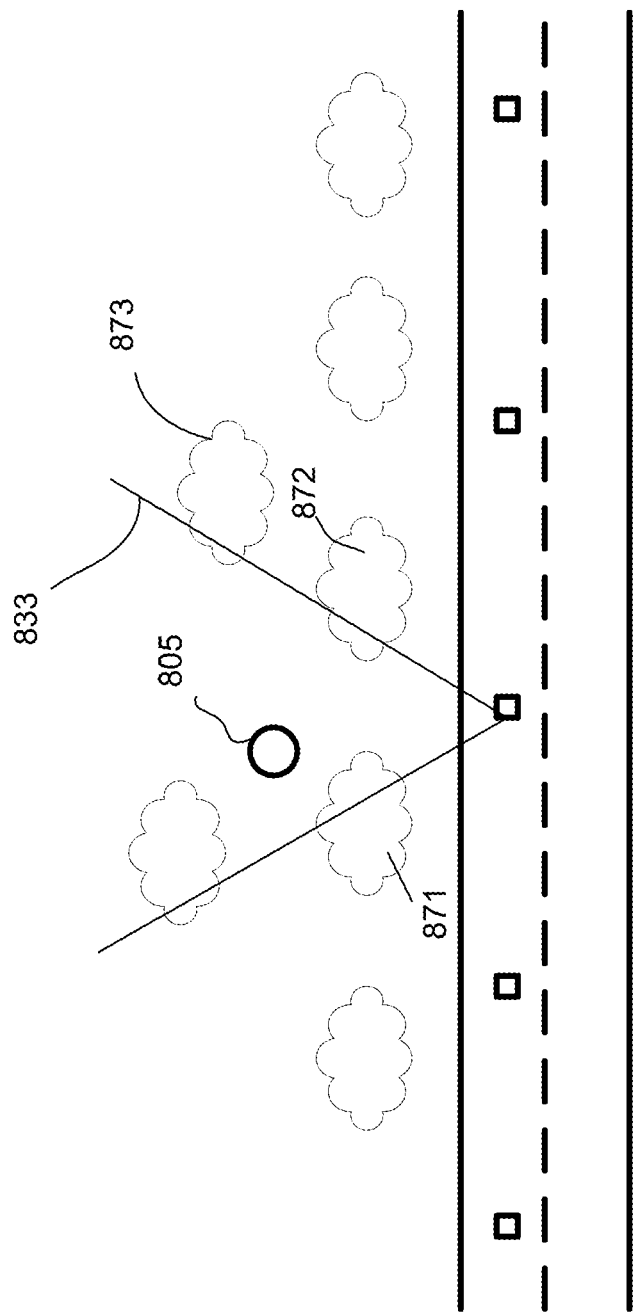
FIG. 8 is a top-view illustration of example obstructions according to aspects of the disclosure.

As mentioned above, computation of the normalized confidence score may be affected by occlusion, such as when other objects impede a view of an object of interest within an image. FIG. 8 provides a top-view illustration of example obstructions 871-873, resulting in at least partial occlusion of object 805. The obstructions 871-873 in this example are trees, although occlusion may occur from weather conditions such as fog, or any other objects, such as people, monuments, buildings, animals, etc. When computing the confidence score for an image corresponding to field of view 833, such occlusion may be accounted for. For example, a radial falloff function may be used representing the probability that the object 805 would be visible in that image conditional on it's actually being there. As another example, a non-radial or location-dependent falloff function may account for factors like local population density or vegetation density which would increase the risk of occlusion. Accordingly, the confidence score includes a discount factor reflecting the likelihood of a false negative for reasons other than non-presence, such as occlusion.

According to some examples, occlusion may occur as a result of performance of an image recognition tool. For example, while there may not be any objects positioned between the camera and the object of interest, the image recognition tool may nevertheless fail to detect the object of interest, such as if the object of interest is far away, small, and/or only represented by a few pixels. Accordingly, a significance of an observation or non-observation may be discounted if an object is far away, small, represented by few pixels, etc.

The falloff function may account for any of various types of occlusion or effects. For example, different types of occlusion may be added or multiplied when applying the falloff function. Further, the falloff function may be applied differently to observations than to non-observations. For example, non-observations may be discounted for occlusion, but not observations. The falloff function may also be trained, for example, if a location of a particular object of interest is known. If locations of every fire hydrant in a given town are known, and imagery for the town is available, various computations using different falloff functions may be performed, and the function producing a result closest to the known locations may be selected.

Figure 9:
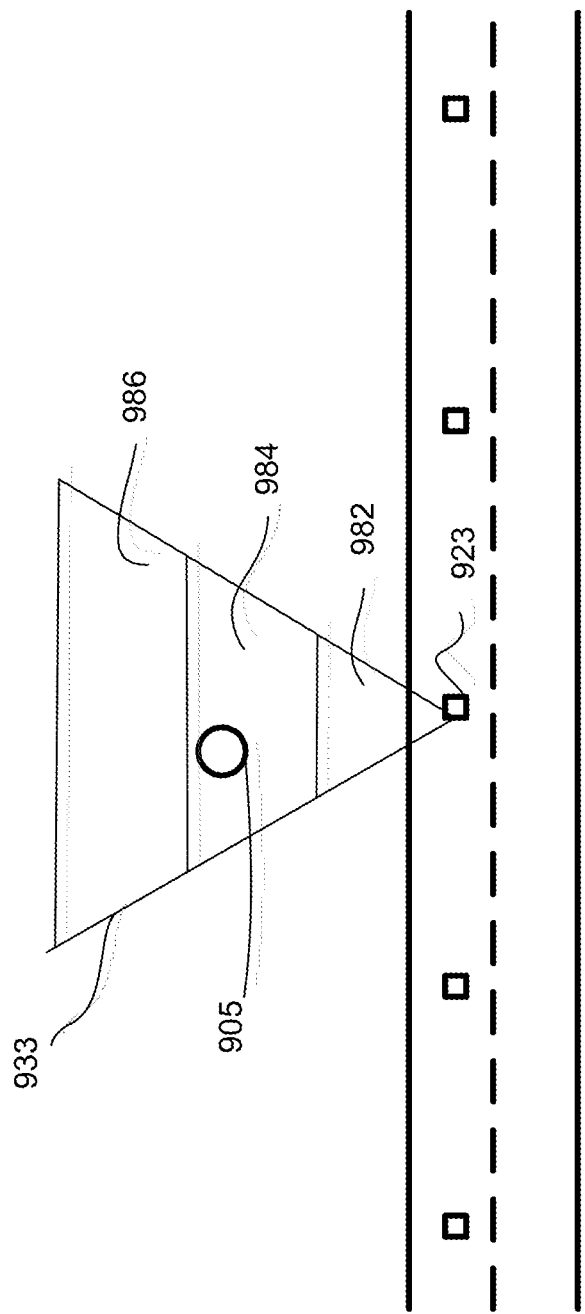
FIG. 9 is a top-view illustration of an example probability of obstructions affecting observations according to aspects of the disclosure.

A likelihood of occlusion may increase as a distance between an image capture location and an object of interest increases. FIG. 9 illustrates an example probability of obstructions affecting observations. Object 905 is within a field of view 933 of an image captured from location 923. The field of view 933 is subdivided into different regions 982, 984, 986 based on the probability of occlusion. For example, for any objects within first region 982, which is closest to the image capture location 923, the probability of occlusion is lowest. For objects within second region 984, such as object 905, the probability of occlusion is higher than for the first region 982. For region 986, which is furthest from the image capture location 923, the risk of occlusion is greatest. In some examples, the probabilities may be adjusted using iterative training based on observations.

The computed location of objects of interest resulting from a semantic search may be used in any of a number of applications. For example, the locations may be used to populate a map to show particular features, such as locations of skate parks, dog parks, fire hydrants, street lights, traffic signs, etc. The locations may also be used by end users searching for particular destinations or trying to understand the landscape of a particular neighborhood. For example, a user looking to purchase a house may wish to search for any power plants or power lines near a prospective home, and determine a precise location of such objects with respect to the home. The prospective homeowner may want to perform a more general search for areas that appear to be "rural," for example, in which case localized objects or attributes such as trees or "green" may be returned. A marketer may wish to determine where particular industries are located in order to serve advertisements to such industries. The marketer may also want to know which of its competitors are advertising in a particular area. An employee of a power company may search for and locate all street lamps. These are just a few of numerous possible example uses.

Figure 10:
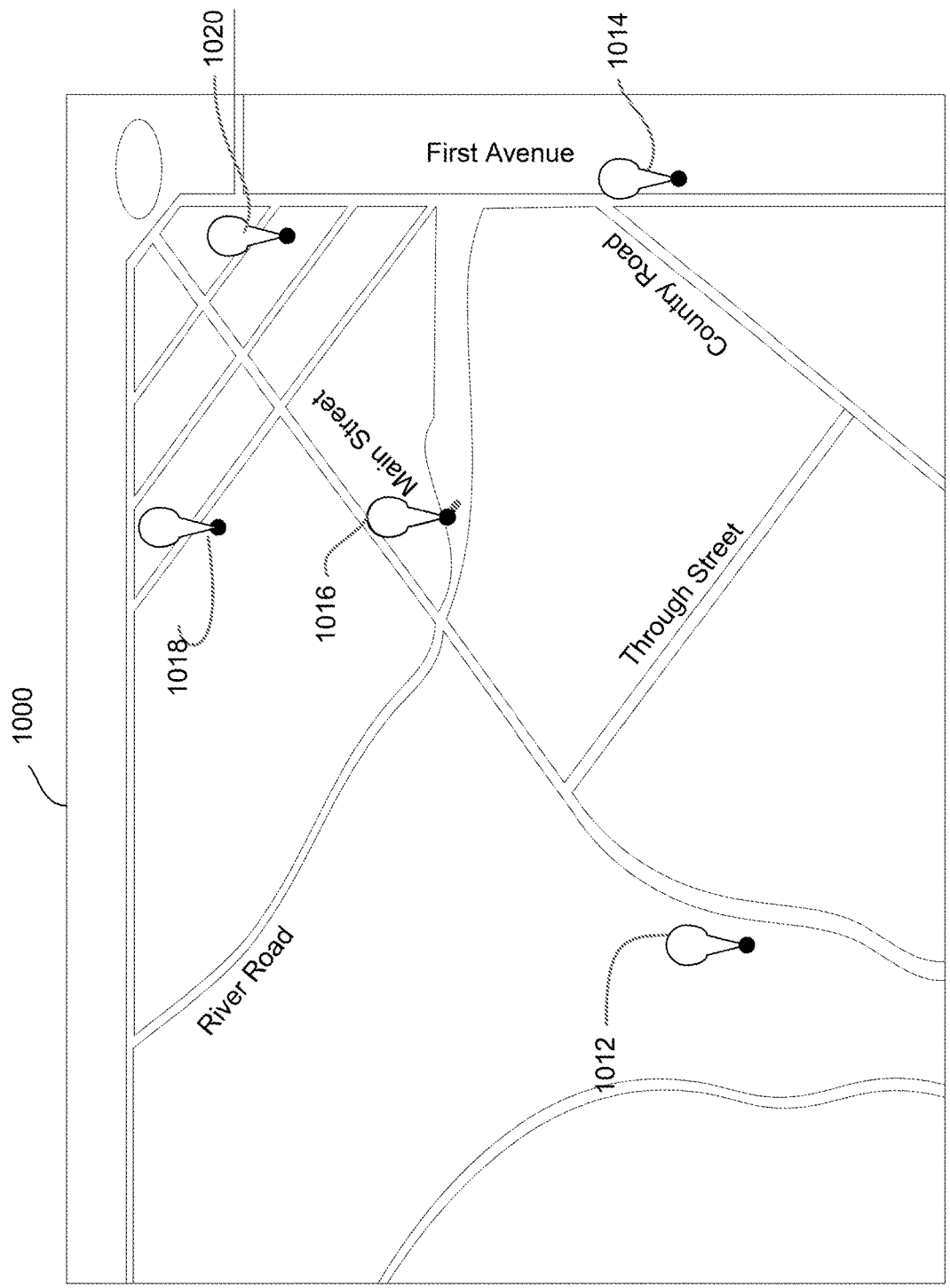
FIG. 10 illustrates an example output of semantic searching using observations and non-observations according to aspects of the disclosure.

FIG. 10 illustrates an example output of semantic searching using observations and non-observations. In this example, a map 1000 is updated to indicate locations of particular objects. The object of interest in the semantic search may be, for example, a fire hydrant. Accordingly, markers 1012, 1014, 1016, 1018, and 1020 are displayed highlighting the locations of the fire hydrants in the displayed region. While markers are shown in FIG. 10, it should be understood that any other indicia may be used, such as icons, text, etc.

Example Methods

Figure 11:
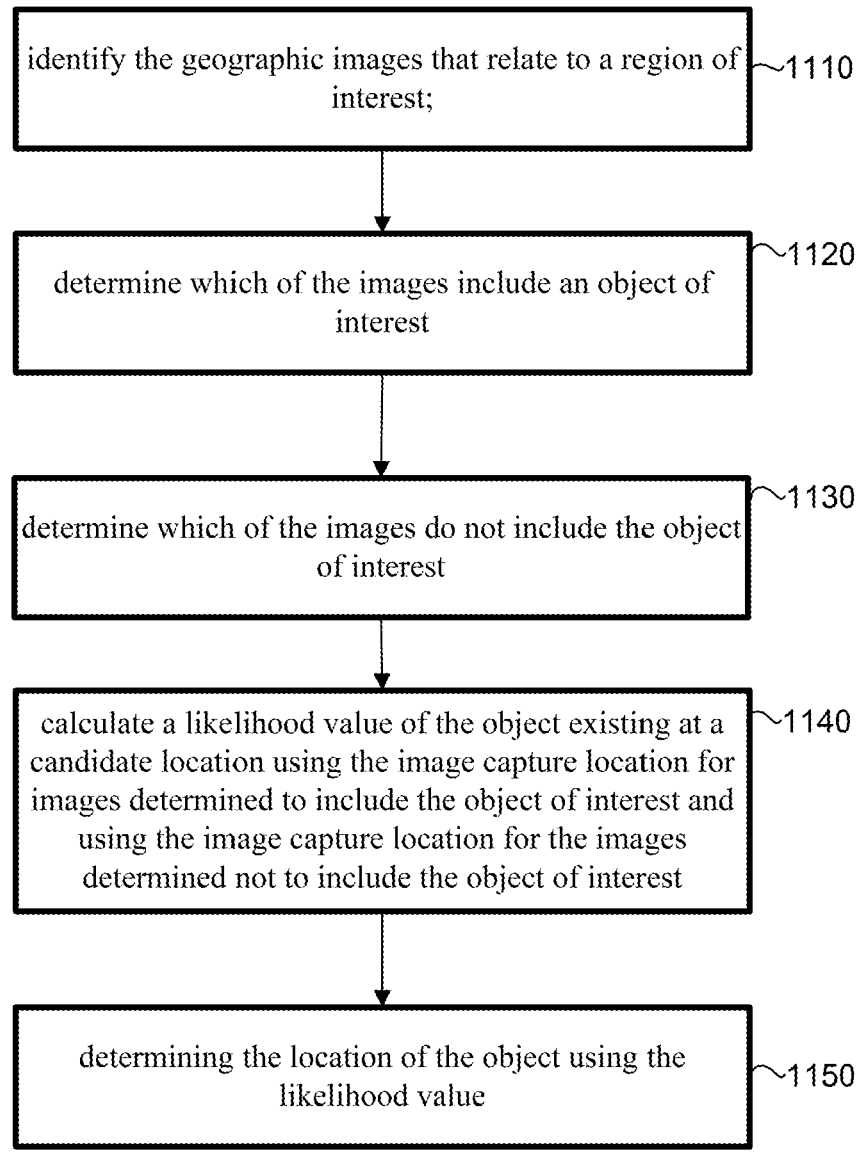
FIG. 11 is a flow-diagram illustrating an example method of determining object locations using observations and non-observations according to aspects of the disclosure.

Further to the example systems described above, FIG. 11 illustrates an example method 1100 for accurately locating objects based on semantic image searching. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

In block 1110, geographic images relating to a region of interest are identified. For example, various images may be stored in association with information indicating a capture location for the images. If a user wants to search for objects within a particular neighborhood, city, country, or other region, images having capture location information within that region may be identified.

In block 1120, it is determined which of the identified images include the object of interest. For example, each of the identified images may be reviewed, such as by applying an image recognition tool.

In block 1130, it is determine which of the identified images do not include the object of interest. For example, during application of the image recognition tool in block 1120, any images in which the object of interest is not detected may be separately identified and/or marked.

Each of the images identified in blocks 1120 and 1130 may include a plurality of candidate locations. In block 1140, for each of a plurality of the candidate locations, though not necessarily all, a likelihood of the object of interest existing at the candidate location is computed. The likelihood may be computed using image capture location information for the images in block 1120 and the images in block 1130. In some examples, the likelihood may also be computed using directional or pose information and other information, such as camera optical characteristics or factors relating to possible occlusion.

In block 1150, a location of the object of interest is determined using the likelihood value. For example, the likelihood value may be normalized, added to an initial value, and compared to a threshold. If the resulting value for a particular candidate location is above the threshold, the location of the object of interest may be determined to be the same as that candidate location.

By using both observations and non-observations to localize a particular object or feature, the location of the object can be determined relatively easily and with relatively high confidence even if the images are not high resolution and/or are associated with low resolution or unreliable image capture information. This can allow object location identification to be performed using non-professional content, e.g. from smartphones, for instance. By using information for images not determined to include the object of interest, object location identification can be improved. Moreover, this can be achieved at no or relatively little computational cost.

While the foregoing examples are described with respect to images, it should be understood that such images may be images in the traditional sense, such as a collection of pixels, or they may be frames from a video, video observations (e.g., a section of a video), LIDAR imaging, radar, imaging, sonar imaging, or even "listening" observations like audio recordings or radio frequency reception. Similarly, the image recognition performed in these examples may be video recognition, LIDAR recognition, audio recognition, etc. Accordingly, observations and non-observations using any of these or other types of imaging may be used to precisely locate an object or attribute.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining a location of an object of interest, the method comprising:
    identifying, from a database of images, a set of plural images that relate to a region of interest, each of the plural images having associated therewith image capture information including at least an image capture location;
    applying an image recognition tool to each image in the set of plural images;
    determining, based on the applying of the image recognition tool, which of the images include the object of interest and which of the images do not include the object of interest;
    for each of multiple candidate locations in the region of interest, calculating a likelihood value of the object of interest existing at the candidate location using the image capture information for images in the set of plural images determined to include the object of interest and using the image capture information for images in the set of plural images determined not to include the object of interest; and
    determining the location of the object using the likelihood values for the multiple candidate locations.

2. The method of claim 1, wherein the image capture information for at least some of the images includes an image capture location and an image capture orientation, and wherein calculating the likelihood value of the object of interest existing at a given location comprises using the image capture orientation.

3. The method of claim 1, wherein determining which of the images include an object of interest and which of the images do not include the object of interest comprises determining a confidence factor that the images include or do not include the object of interest, and wherein calculating the likelihood value of the object of interest existing at the location comprises using the using the determined confidence factor.

4. The method of claim 1, wherein calculating the likelihood value of the object of interest existing at the candidate location comprises:
    applying a factor with a first sign for the images in the set of plural images determined to include the object of interest, and
    applying a factor with a second sign for the images in the set of plural images determined not to include the object of interest, the second sign being opposite the first sign.

5. The method of claim 1, wherein the multiple candidate locations in the region of interest comprise a grid of multiple locations.

6. The method of claim 1, wherein the multiple candidate locations include locations contained in a field of view of each image of the set of plural images.

7. The method of claim 1, wherein the image recognition tool is configured to detect discrete objects.

8. The method of claim 1, wherein the image recognition tool is configured to detect objects having specific characteristics.

9. The method of claim 1, wherein the image recognition tool is selected from a library of image recognition tools.

10. A system, comprising:
    memory storing a plurality of images in association with location information; and
    one or more processor in communication with the memory, the one or more processors programmed to:
        identify, from the plurality of images, a set of images that relate to a region of interest;
        determine, using image recognition, which of the images include the object of interest;
        determine, using image recognition, which of the images do not include the object of interest;
        for each of multiple candidate locations in the region of interest, calculate a likelihood value of the object of interest existing at the candidate location using the location information for images in the set of images determined to include the object of interest and using the location information for images in the set of images determined not to include the object of interest; and
        determining the location of the object using the likelihood values for the multiple candidate locations.

11. The system of claim 10, wherein the location information includes image capture information.

12. The system of claim 11, wherein the image capture information for at least some of the images includes an image capture location and an image capture orientation, and wherein calculating the likelihood value of the object of interest existing at a given location comprises using the image capture orientation.

13. The system of claim 10, wherein determining which of the images include an object of interest and which of the images do not include the object of interest comprises determining a confidence factor that the images include or do not include the object of interest, and wherein calculating the likelihood value of the object of interest existing at the location comprises using the using the determined confidence factor.

14. The system of claim 10, wherein calculating the likelihood value of the object of interest existing at the candidate location comprises:
   applying a factor with a first sign for the images in the set of plural images determined to include the object of interest, and
   applying a factor with a second sign for the images in the set of plural images determined not to include the object of interest, the second sign being opposite the first sign.

15. The system of claim 10, wherein the multiple candidate locations in the region of interest comprise a grid of multiple locations.

16. The system of claim 10, wherein the multiple candidate locations include locations contained in a field of view of each image of the set of images.

17. The system of claim 10, wherein an image recognition tool is configured to detect discrete objects.

18. The system of claim 10, wherein an image recognition tool is configured to detect objects having specific characteristics.

19. The system of claim 10, wherein the one or more processors are further configured to provide the determined location information for output to a display.

20. A computer-readable medium storing instructions executable by a processor for performing a method of determining a location of an object of interest, the method comprising:
   identifying, from a database of images, a set of plural images that relate to a region of interest, each of the images having associated therewith image capture information including at least an image capture location;
   applying an image recognition tool to each image in the set of images;
   determining, based on the applying of the image recognition tool, which of the images include the object of interest and which of the images do not include the object of interest;
   for each of multiple candidate locations in the region of interest, calculating a likelihood value of the object of interest existing at the candidate location using the image capture information for images in the set of plural images determined to include the object of interest and using the image capture information for images in the set of images determined not to include the object of interest; and
   determining the location of the object using the likelihood values for the multiple candidate locations.

* * * * *